QUADRATURE REJECTION CIRCUIT USING BIASED DIODE BRIDGE

Filed March 15, 1963

INVENTORS
FRANK PRAPIS
GUNTER J. GESSNER
Roland Plottel
ATTORNEY

United States Patent Office 3,244,987

Patented Apr. 5, 1966

3,244,987

QUADRATURE REJECTION CIRCUIT USING BIASED DIODE BRIDGE

Frank Prapis, Paterson, and Gunter J. Gessner, Maywood, N.J., assignors to The Bendix Corporation, Teterboro, N.J., a corporation of Delaware Filed Mar. 15, 1963, Ser. No. 265,472
5 Claims. (Cl. 328—166)

The invention relates generally to electronic circuits and in particular to quadrature rejection circuits.

Quadrature may be defined as a signal 90° out of phase with respect to a reference. Quadrature is generated in many conarol system devices such as resolvers and synchros; the quadrature in the control system is undesirable because it interferes with efficient operation of other control system devices such as motors and servoamplifiers. In particular, the guadratures in motors cause heating and loss of torque; and in the servoamplifiers, cause overloading and a large reduction of inphase signals.

There is outlined above two examples where quadrature is undesirable. The circuit of the invention finds application for use with servomotors and servoamplifiers. The circuit of the invention, however, is a general purpose circuit adapted to remove quadrature from a signal regardless of the application for which the signal may be used.

An object of the present invention is to provide a novel circuit to reject quadrature.

Another object of the invention is to provide a novel quadrature rejection circuit having a simple design, requiring only a few components which are all passive.

Another object of the invention is to provide a novel circuit for rejecting quadrature where the quadrature is many times larger in amplitude than an inphase component.

A further object of the invention is to provide a novel general purpose quadrature rejection circuit finding application wherever quadrature rejection may be required.

These and other objects and features of the invention are pointed out in the following description in terms of the embodiment thereof which is shown in the accompanying drawing. It is to be understood, however, that the drawings are for the purpose of illustration only and are not a definition of the limits of the invention, reference being had to the appended claims for this purpose.

Figures 1, 2, 3, 4, 5:
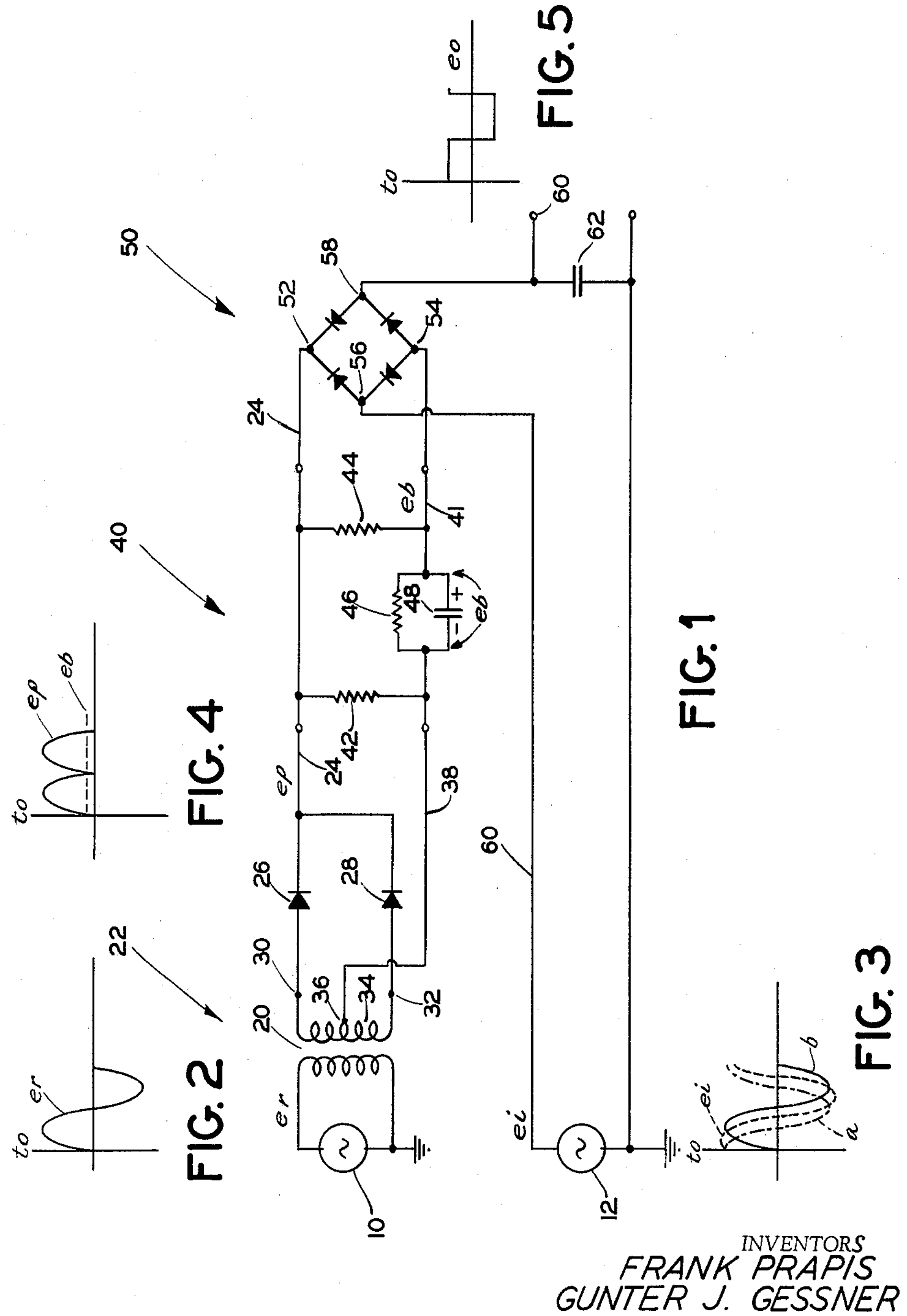
FIGURE 1 shows schematically a circuit constructed in accordance with the invention.
FIGURE 2 shows graphically the waveform of the single cycle reference voltage $e_r$ provided by source 10 of the circuit of FIGURE 1 and referenced to an arbitrary time $t_0$.
FIGURE 3 shows graphically the waveform of the single cycle input voltage $e_i$ provided by source 12 of the circuit of FIGURE 1 having an inphase component 90° phase shifted from the reference $e_r$.
FIGURE 4 shows graphically the waveform of the rectified signal $e_p$ provided through the rectifier 22 and referenced to time $t_0$.
FIGURE 5 shows graphically a waveform of a single cycle of output voltage $e_0$ provided across capacitor 62.

Referring to the drawing of FIGURE 1, there are shown two A.C. voltage sources 10 and 12. Source 10 provides a reference voltage $e_r$ which may, for example, be a sinusoid of 28 volts R.M.S. at 400 c.p.s. A waveform of a single cycle of the reference voltage $e_r$ referenced to an arbitrary time $t_0$, is shown in FIGURE 2 bearing the legend $e_r$.

The second scource 12 provides an alternating input voltage $e_i$ of the same frequency as the reference voltage $e_r$. Input voltage $e_i$ has an inphase component 90° phase shifted from the reference $e_r$ and a quadrature component. A waveform of a single cycle of the input voltage $e_i$, referenced to time $t_0$, is shown in FIGURE 3 bearing the legend $e_i$; the inphase component bears legend *a* and the quadrature component is legended *b*. The amplitude of $e_i$ may, for example, be two volts peak to peak.

The reference voltage $e_r$ is applied through an isolation transformer 20 to a rectifier 22 which provides a full wave rectified voltage $e_p$ on transmission line 24. Rectifier 20 is made up of two diodes 26 and 28 forward biased respectively from end terminals 30 and 32 of the transformer's 20 secondary winding 34 to the transmission line 24. A reference potential for the rectified voltage $e_p$ is provided at a center tap 36 on transformer secondary 34 and brought out on conductor 38. Transformer 20 may, for example, have a winding 1:1:1 and thus the peak to peak amplitude of rectified signal $e_p$ is approximated 40 volts. A waveform of the rectified signal $e_p$ is shown referenced to time $t_0$ in FIGURE 4 and bears the legend $e_p$.

The transmission line 24 and the center tap 36 (via conductor 38) are connected to a divider and filter 40 which provides on an output conductor 41 a D.C. signal $e_b$ having an amplitude less than $e_p$, which, for example, may be 4.5 volts.

Divider and filter 40 is made up of resistor 42 connecting transmission line 24 to conductor 38; a second resistor 44 connecting transmission line 24 to output conductor 41, and a parallel combination of a resistor 46 and a capacitor 48 joining conductor 38 to conductor 41. Resistors 44 and 46 form a voltage divider for voltage $e_p$, capacitor 48 and resistors 44 and 46 are of sufficient size to provide a long time constant relative to the period of a cycle of the rectified voltage $e_p$ so that these elements form a filter. Thus, in the steady state, there is built up and maintained, across capacitor 48 a substantially constant charge, providing a potential, proportional to the value of resistor 44 divided by the value of resistor 44 plus resistor 46. As an example, if the values of resistor 44 is 50 kilohms, resistor 46 is 10 kilohms, and the value of capacitor 48, is 20 microfarads, the charge on capacitor 48 would produce a potential of approximately 4.5 volts across the capacitor with positive on output conductor 41. This voltage is designated $e_b$.

Resistor 42 provides a return path to reference 36 from a gate 50 as is described below. Resistor 42 is smaller than both resistor 44 and 46 so that the time constant of resistor 42 with capacitor 48 is shorter than the time constants of emitter resistors 44 and 46 with capacitor 48. Resistor 42 may, for example, be 2.2 kilohms.

The rectified signal $e_p$ and the D.C. signal $e_b$ are applied respectively via the conductors 24 and 41 to a gate 50 having control terminals 52 and 54. Gate 50 has an input terminal 56 and an output terminal 58, and will pass a signal from the input 56 to the output 58 in accordance with the signals applied at control terminals 52 and 54. The input voltage $e_i$ from source 12 is applied through a conductor 60 to input terminal 56 and the output 58 is applied across a storage capacitor 62 to ground. The gate 50 is made up of four diodes arranged in bridge configuration and all oriented forward conducting from terminal 54 to terminal 52.

During the portion of a cycle when the rectified signal $e_p$ applied to terminal 52, exceeds the filtered signal $e_b$ applied to terminal 54, the diodes in the gate 50 are reverse biased, and a path from terminal 56 to terminal 58 has a very high impedance (in effect open circuit) thereby blocking the voltage from source 12 to the output 58. When the rectified signal $e_p$ is smaller than the filtered signal $e_b$, the charge on capacitor 48 finds a conducting path through the diodes of the bridge 50 and through resistor 42, to reference 36 thus forward biasing the bridge diodes; and there is a low impedance (virtual short circuit) between terminal 56 and output terminal 58.

It is essential to the operation of the circuit that the amplitude of the input signal $e_i$ be smaller than the amplitudes of both the filtered signal $e_b$ and the rectified signal $e_p$. Thus the input signal $e_i$ operates as a small signal superimposed on the bias provided by the rectified and filtered signals and does not influence the bias of the diodes. The signal $e_i$, for example, may be two volts peak to peak.

Referring now to the waveforms and in particular to the waveform of the rectified signal $e_p$ with the level of the filtered signal $e_b$ shown on the same co-ordinates, it will be observed that when signal $e_b$ exceeds $e_p$, the gate 50 is "open" and the input signal $e_i$ passes from terminal 56 to output terminal 58. At this time, the inphase component legend *a* is large passing through a maximum and the quadrature component *b* is small passing through zero.

When the rectified signal $e_p$ exceeds the filtered signal $e_b$, the gate is "closed" and the input signal $e_i$ does not pass therethrough. This occurs when the quadrature component *b* is large and passes through a maximum, and the inphase component is small and passes through minimal values. The output from the gate is available at output terminal 60 across storage capacitor 62.

The gate 50 is open for a small portion of an entire cycle and twice for each cycle. The first time it is open the inphase component is at a maximum applying a positive pulse to the storage capacitor 62, which charges to the maximum value of the inphase voltage. Capacitor 62 holds this potential until the next time the gate is opened when a negative pulse is applied to the capacitor 62 to clamp a negative potential on the storage capacitor 62. This negative charge will be held on the capacitor 62 until the next time the gate is opened in the next cycle. The amplitude of the charge on capacitor 62 is proportional to the amplitude of the inphase component of input signal $e_i$. An output signal $e_o$ is taken across capacitor 62 and is a square wave which varies in amplitude in accordance with the amplitude of the inphase component of the input signal $e_i$. The output signal $e_o$ may be slightly phase displaced from the inphase component proportional to the time during which gate 50 is open. In the example shown, the gate is open for approximately 10° of the 360° of the cycle. The output is thus phase shifted approximately 5°. This phase shift may be lessened by opening the gate for a shorter period of time, and this adjustment may be made by providing a greater voltage difference between the filter signal $e_b$ and the rectified signal $e_p$. A waveform of a single cycle of output signal referenced to the time $t_0$ is shown bearing the legend $e_o$. It should be noted that the output signal $e_o$ is phase shifted approximately 90° from the inphase component and is free from quadrature.

In summary, there has been shown a quadrature rejection circuit that receives a reference signal and an input signal, the input signal having an inphase and quadrature component. The circuit provides a square wave output signal whose amplitude varies in accordance with the amplitude of the inphase component of input signal, and which is substantially in phase with the reference signal. What is significant is that the output signal has no quadrature component.

The input signal may have quadrature components which are much larger than the inphase component. So long as the rectified signal $e_p$ and the filtered signal $e_b$ are larger than the amplitude of the input signal, the output signal will be proportional only to inphase component and will not be affected by the quadrature component thus providing complete quadrature rejection.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A gate circuit having an input and an output, means for providing alternating current signals with a desired phase component and a quadrature voltage connected to the input, a bridge circuit having four diodes and a terminal between each pair of diodes, the input and the output being connected in series directly to two opposing terminals of the bridge circuit, means for providing a full wave rectified sinusoidal voltage and a substantially constant unidirectional voltage connected across the other two opposing terminals of the bridge circuit to periodically render the diodes conducting when the constant unidirectional voltage exceeds the rectified sinusoidal voltage and timed to render the diodes conducting when the desired phase component is a maximum and the quadrature voltage is a minimum to pass the desired phase component of the signals and reject the quadrature voltage.

2. A gate circuit as defined in claim 1 in which the output comprises a storage capacitor.

3. A gate circuit as defined in claim 1 in which the full wave rectified sinusoidal voltage is twice the frequency of the signals.

4. A gate circuit as defined in claim 1 in which the full wave rectified sinusoidal voltage and the substantially constant unidirectional voltage are of the same polarity.

5. A gate circuit as defined in claim 1 in which the full wave rectified sinusoidal voltage is connected to the cathodes of two of the diodes at one terminal and the substantially constant unidirectional voltage is connected to the anodes of the other two diodes at an opposing terminal.

References Cited by the Examiner

UNITED STATES PATENTS

| | | | |
|---|---|---|---|
| 2,829,251 | 4/1958 | Patton. | |
| 2,982,867 | 5/1961 | Wennerberg | 328—166 |
| 3,011,129 | 11/1961 | Magleby et al. | 307—88.5 |
| 3,030,522 | 4/1962 | Fennick | 328—166 X |
| 3,065,361 | 11/1962 | Brook | 328—166 X |
| 3,077,544 | 2/1963 | Connelly | 307—88.5 |
| 3,155,892 | 11/1964 | Karlson | 307—88.5 |
| 3,165,704 | 1/1965 | Shacknow | 328—166 |

OTHER REFERENCES

IBM Technical Disclosure Bulletin, "Sine Wave Amplitude Limiter," by Van Winkle, vol. 2, No. 4, December 1959.

JOHN W. HUCKERT, *Primary Examiner.*

J. D. CRAIG, *Assistant Examiner.*